(12) United States Patent
Huber et al.

(10) Patent No.: US 8,696,477 B2
(45) Date of Patent: Apr. 15, 2014

(54) METHOD FOR MANUFACTURING A THREAD-FORMING SCREW

(75) Inventors: Franz Huber, Markt Wald (DE); Martin Pleil, Feldkirch (AT); Carl Hoffmann, Bodolz (DE); Andreas Vorhauer, Sulz (AT); Simon Oppeneiger, Hoechst (AT); Berthold Aumueller, Grafenwoehr (DE); Georg Oberndorfer, Feldkirch (AT); Juergen Gahn, Altstaetten (CH); Corinna Achleitner, Bludenz (AT)

(73) Assignee: Hilti Aktiengesellschaft, Schaan (LI)

( * ) Notice: Subject to any disclaimer, the term of this patent is extended or adjusted under 35 U.S.C. 154(b) by 772 days.

(21) Appl. No.: 12/639,839

(22) Filed: Dec. 16, 2009

(65) Prior Publication Data

US 2010/0216560 A1    Aug. 26, 2010

(30) Foreign Application Priority Data

Dec. 17, 2008   (DE) .......................... 10 2008 054 824

(51) Int. Cl.
*B21H 3/02*   (2006.01)

(52) U.S. Cl.
USPC ........................................... 470/10

(58) Field of Classification Search
USPC .......... 411/387.4, 387.5; 470/8–10, 186, 185, 470/84
See application file for complete search history.

(56) References Cited

U.S. PATENT DOCUMENTS

| 4,420,848 | A  | * | 12/1983 | Becker ............................. 470/22 |
| 6,669,424 | B1 | * | 12/2003 | Bauer ............................ 411/433 |
| 8,182,186 | B2 | * | 5/2012  | Huber et al. ................... 411/386 |
| 2006/0120826 | A1 | * | 6/2006 | Wieser et al. ............. 411/387.4 |
| 2006/0193713 | A1 | * | 8/2006 | Gerhard ..................... 411/387.4 |

FOREIGN PATENT DOCUMENTS

| EP | 1 655 498 A1 | 5/2006 |
| EP | 1 595 080 A2 | 11/2006 |

\* cited by examiner

*Primary Examiner* — Debra Sullivan
(74) *Attorney, Agent, or Firm* — Crowell & Moring LLP

(57) ABSTRACT

A method for manufacturing a thread-forming screw having a shank and a thread formed in one piece with the shank and region-wise circumferentially arranged on the shank, is disclosed. After the formation of the thread on the shank, a plurality of recesses is subsequently stamped into the thread. Then, a plurality of compact cutting elements is welded into the recesses in the thread, where the cutting elements are made of a hard material and have a hardness greater than the hardness of the thread. Additionally, a stamping device for carrying out the method is also disclosed.

14 Claims, 3 Drawing Sheets

METHOD FOR MANUFACTURING A THREAD-FORMING SCREW

This application claims the priority of German Patent Document No. 10 2008 054 824.3, filed Dec. 17, 2008, the disclosure of which is expressly incorporated by reference herein.

BACKGROUND AND SUMMARY OF THE INVENTION

The invention relates to a method for manufacturing a thread-forming screw and a stamping device for carrying out the method.

Thread-forming screws have a shank, which is provided, at least region-wise, with a thread as an external thread, and with a screw head at one end, for example, serving as a load application means To permit thread-forming or thread-cutting screws to form a counter-thread in the substrate, the thread is hardened region-wise, for example, so as to increase the strength. For exterior applications, screws, such as concrete screws, are also manufactured of corrosion-resistant steel materials whose strength normally cannot be increased enough by heat treatment to allow a secure cutting into concrete.

A thread-forming screw of a metal is known from European Patent Document No. EP 1 595 080 B1 where cutting elements of a metal having a higher carbon content are welded on. Therefore, the cutting elements have a hardness that is greater than the hardness of the screw or the thread, respectively. In welded-on state, the cutting elements have a small projection with respect to the outside contour of the thread.

The disadvantage of the known solution is that for welding on the cutting elements, the base material, at least of the thread or the screw, respectively, in this region, must be sufficiently softened so that the cutting element can be pressed into the thread. According to EP 1 595 080 B1, this is the only way that the cutting element can be sufficiently anchored in the thread or the core, respectively, and an excessive projection beyond the outside contour of the thread can be prevented. As a result of the long process time required for this, the screw material is locally brought to high heat which alters the structure of the base material and may lead to the formation of cracks in the material.

In the fixing region the corrosion resistance of the shank may decrease region-wise due to the action of the heat.

The object of the invention is to create a method for manufacturing a thread-forming screw, especially of a corrosion-resistant material, with welded-in cutting elements, which prevents the above-mentioned disadvantages and allows a simple manufacturing of the screw.

According to the invention, the method for manufacturing a thread-forming screw having a shank and at least one thread formed in one piece with the shank and at least region-wise circumferentially arranged on said shank comprises the following steps.

First, the thread is formed on the shank, for example by using a rolling process. Then, a plurality of recesses or indentations is stamped into the thread, wherein the material of the screw is hardened in this region, at least in part. Then, a plurality of compact cutting elements is welded into the previously generated recesses in the thread. The cutting elements are made of a hard material and have a hardness greater than the hardness of the thread.

The cutting elements have an extent following the course of the thread, for example, which corresponds to the extent of the corresponding recesses in the thread. As a result of the arrangement of the cutting elements in recesses in the thread, the base material of the thread or the screw, respectively, is melted to a lesser degree, and therefore, the corrosion resistance of the screw is also largely preserved in the fixing region of the cutting elements. The recess for receiving a cutting element extends, for example, in the direction of the course of the thread, which substantially corresponds to the corresponding extent of the cutting element in its arranged state in the thread.

The recesses are generated in the thread during the stamping in only one forming step, wherein the generated recess or indentation may reach into the core of the screw. The recesses are configured point-shaped or line-shaped, for example. In this context, point-shaped means a recess whose longitudinal extent along the thread corresponds to a maximum of 1.5 times the width extent of the thread on the thread bottom, i.e., on the outside of the shank.

Line-shaped in this context means a recess having a longitudinal extent along the thread of more than 1.5 times the width extent of the thread on the thread bottom, i.e., on the outside of the shank.

Due to the welding into the recesses, the compact cutting elements are so firmly bonded with the thread that they are sufficiently held in the screw, both in the screwing-in and in counter screwing-in direction of the thread-forming screw as well as radially. The wearing of the thread of the screw that is formed in one piece with the shank is reduced even with hard mineral substrates, such as high-strength types of concrete, compared to a thread-forming screw without a cutting element, and the thread-forming process during the setting of the thread-forming screw is improved. In spite of the advantageous setting behavior, the corrosion resistance of the screw is largely preserved, and because of the low wear of the thread higher load ratings are achieved for a set screw compared to existing systems. Furthermore, the core requires no additional processing, which likewise has a favorable effect, for example, on the corrosion resistance and the cost-effective manufacture of the thread-forming screw. The screw is advantageously made of an austenitic corrosion-resistant steel.

The cutting elements advantageously already have a cutting geometry that corresponds to their function and carry out this function immediately after being fixed in the thread. A complex subsequent mechanical finishing of the cutting elements welded into the thread, for example by grinding, milling or hardening, is not required. The hardness of the boundary layer of the cutting elements and thus the advantageous thread-forming properties of the cutting elements are preserved.

The form of the cutting elements and their number are freely selectable and advantageously based on the effect to be achieved. For example, the cutting elements have a sphere-like, cylindrical, rectangular, conical, or pyramidal form. The cutting elements can also be configured as a so-called cutting tooth, such as used for demolition and mining. In order to additionally influence the thread-forming behavior of the thread-forming screw, the cutting elements can also be arranged inclined relative to a tangent applied to the outside contour of the thread. The angle of inclination is 5° to 15°, for example.

The number of cutting elements arranged in the thread depends on the length of the thread and the grooving to be completed as well as the substrate material, in which the thread-forming screw is to be set. According to an advantageous embodiment of the thread-forming screw of the invention, only in one region starting from the setting direction end, a certain number, for example, from four to fifteen cutting elements are provided in the thread spaced apart from each other, while the rest of the thread has no cutting elements. In order to achieve certain setting properties, cutting elements of different configurations may also be arranged on a thread-forming screw.

Advantageously, the fixed cutting elements harmonically continue the thread, at least region-wise, which results in advantageous grooving properties for the screw and a low wearing of the thread. Alternatively, the fixed cutting elements project at least region-wise radially outward beyond the thread, which generates strong grooving and thus increases the removal of the grooved substrate.

In an arrangement of a plurality of cutting means along the course of the thread, for example, the cutting elements fixed in the recesses by means of welding and facing the setting direction end project radially and the following cutting elements decrease continuously in their radial projection until their radial projection corresponds to the radial extent of the thread and the cutting elements thus harmonically continue the thread.

In addition to the compact cutting elements of hard material, cutting elements made of a weld metal, for example, according to a metal gas-shielded metal-arc welding process or by laser cladding, can also be arranged on the thread. Depending on the requirements, these additional cutting means are advantageously also arranged in previously stamped recesses in the thread. The additional cutting means support the compact cutting elements of a hard metal that are welded into the recesses in the grooving of the counter-thread in the substrate. For example, the cutting elements made of a weld metal are provided on the thread alternating with the compact cutting elements of a hard material. Alternatively, in the region of the thread which first comes into contact with the substrate, compact cutting elements of a hard material are arranged in recesses followed by cutting elements of a weld metal arranged in recesses or directly on the thread. According to another alternative, depending on the hardness of the arranged cutting elements, cutting elements of a weld metal followed by compact cutting elements of a hard material can be arranged in the thread in the region of the thread which first comes into contact with the substrate.

The stamping of the recesses and the welding in of the compact cutting elements are preferably directly interlinked, and therefore, the screw does not have to be readjusted for the welding of the cutting elements into the recesses. For example, during the stamping of the recesses, the screw is held by a manipulator, subsequently moved by the manipulator to the welding station and held by it during the welding process.

Preferably, a plurality of recesses is stamped into the thread at the same time. This can increase the process speed and increases the life of the tool, for example of a stamping die.

A plurality of successive recesses is preferably stamped at a distance from each other. The distance increases starting at one free end region of the shank along the course of the thread. In the region of the thread which first comes into contact with the substrate when the thread-forming screw is set, the cutting elements are advantageously arranged close to each other. In a section opposite the setting direction end, the cutting elements can be spaced further apart from each other because these cutting elements substantially only have a re-grooving function and merely serve to achieve an advantageous setting process of the screw in the substrate.

After the stamping, the recesses, preferably each, have a bottom section radially spaced apart from the outer circumference of the shank. The bottom section of the recess is advantageously spaced apart from the outer circumference of the shank such that during the welding of the cutting elements into the recess, only material of the thread formed on the shank is melted, and thus the shank as such is at most slightly exposed to thermal stress. The corrosion resistance of the shank of a screw of a corrosion-resistant material is largely preserved.

After the stamping, the recesses preferably have walls and the cutting element to be positioned in the recess is arranged so as to be spaced apart at least from one of the walls. This provides defined free spaces for removed material which improves the thread-forming process and thus facilitates the setting behavior of the screw of the invention.

According to a preferred embodiment of the screw, the cutting element is fixed by welding only on the bottom section of the recess and arranged so as to be spaced apart from both lateral walls of the recess. This freestanding arrangement of the cutting means in the recess, for example in combination with an ovaloid or spherical form of the cutting element, leads to an advantageous cutting behavior or thread-forming process and thus a better setting behavior. As a result, the setting time of a screw is reduced, on the one hand, and on the other hand, a lower torque is needed for setting the screw compared to the conventional thread-forming screws. This substantially contributes to the economy of the screw manufactured according to the method of the invention.

Alternatively, the cutting element is arranged directly adjacent to one of the walls of the recess and spaced apart from the other opposite wall, which provides a defined free space for removed material in front, behind or laterally next to the cutting element.

The compact cutting elements are preferably fixed in the recesses by means of electric resistance welding. This ensures a sufficiently firm bonding of the cutting elements in the recesses. In electric resistance welding, a high current is caused to flow between two bodies and at the same time the two bodies are pressed together by pressure. At the point of the highest electrical resistance, generally at the junction between the two bodies, high heat is generated which melts adjacent base material and thus establishes a connection between the bodies. Depending on the desired quality of the welding and the arrangement, different types of resistance welding methods may be used, such as the tip ignition method. Advantageously, methods should be selected that generate small zones influenced by the heat in the base material, especially the shank, and have short cycle times. As a result, the thread-forming screw is not only easy to manufacture, but the arrangement of the cutting elements has only a minor influence on the corrosion resistance of the screw.

Alternative welding methods for fixing the compact cutting elements in the recesses are friction welding, orbital welding, laser welding, or ultrasound welding.

The welding process for fixing the cutting elements in the recesses preferably takes place in a plurality of phases so that the compact cutting elements can be fixed on the thread by using welding programs especially optimized for this application. The welding programs control the time sequences and the level of the applied welding currents.

The phases of the welding process are preferably controlled via a closed loop, where the result influences the control variables of the welding equipment via feedback. Any interference variables and changes which may occur are taken into account and adjusted for by the control. A corresponding control of the welding parameters results in small zones influenced by the heat and therefore minimizes the degree of melting of the core and/or thread material, which is especially important for the corrosion resistance. The region-wise blending between the base material and cutting elements should be as low as possible, but sufficient to securely hold the cutting element in the thread and allow that the forces acting upon the cutting element during the setting of the screw can be diverted to the thread and thus the shank.

The welding process preferably comprises a first phase for heating the base material of the screw, a second phase for fixing the cutting elements in the recesses, and a third phase for cooling down the completed welding.

The first phase is the controlled heating phase that ensures, through locally restricted softening of the joining partners, in this case the screw material and the compact cutting elements, a secure bonding and partial preheating of the joining partners. The second phase is the controlled welding phase. The third phase is the controlled cool-down phase, which is especially advantageous for hard cutting elements, because it minimizes the formation of cracks through thermal shock during the cool-down.

The first phase, the second phase, and/or the third phase preferably consist of a plurality of partial phases, so that the heating, welding and cooling down can be optimally adjusted to the properties of the material of the joining partners.

The slope delta power to delta time is preferably steeper in the second phase than in the first phase so as to ensure a sufficient fixing of the cutting elements in the recesses in an advantageous manner.

The welding process preferably takes place with a defined contact pressing force of 5 N to 100 N coming from a holding device for the welded body and acting upon the welded body.

The rate of the defined contact pressing force is preferably 10 N to 60 N and especially 15 N to 40 N. The defined contact pressing force acting upon the cutting element secures that the correct position of the cutting element in the recess is precisely achieved and established and additionally ensures a sufficient fixing of the cutting elements in the recesses in an advantageous manner. If the cutting element is fixed in the recess by means of resistance welding, the flow of the welding current is improved by the contact pressing force acting upon the cutting element.

The defined contact pressing force preferably acts multi-axially, and the contact pressing force can advantageously act bi-axially or tri-axially. Due to the mobility of the holding device for the welded body (in the case of resistance welding a welding electrode, for example) caused by the respective multi-axiality, the compact cutting element, especially during the second and possibly during the third phase, may experience a relative motion with respect to the shank and thread of the screw which further improves the connecting quality of the fixing generated in the recess. For example, a bi-axially acting defined contact pressing force, on the one hand, acts radially upon the cutting element, which means in the direction of the shank, at 5 N to 100 N, and tangentially, on the other hand, which means in the direction of the thread, at 5 N to 100 N. The rate of the contact pressing force components of the defined contact pressing force does not necessarily need to be identical in radial and tangential direction.

A stamping device for stamping recesses in the thread of a screw is provided with at least one holding device for holding the screw during the stamping process and at least one stamping die for generating the recess in the thread of the screw.

The shaping portion of the at least one stamping die is formed according to the desired configuration of the recess to be produced. The at least one holding device holds the screw in the corresponding orientation so that the recess can be stamped in the desired position in the thread in a repeatable and precise manner.

A plurality of stamping dies is preferably provided for simultaneously generating a plurality of recesses. This reduces the cycle times for manufacturing the thread-forming screw compared to individually forming each recess. In this case, a stamping die can simultaneously form more than one recess in the thread. Alternatively, a plurality of stamping dies is provided, each of which forming one or a plurality of recesses in a feeding process in the thread of the screw.

If a plurality of stamping dies is provided or if one stamping die has a plurality of shaping portions, these are advantageously identically formed.

The at least one holding device and the at least one stamping die are preferably individually controlled. As a result, the retention forces acting upon the screw as well as the stamping forces may be set differently. Therefore, deformations of the screw or the thread and especially a warping of the shank can be prevented.

The invention is described in greater detail below according to exemplary embodiments.

DETAILED DESCRIPTION OF THE DRAWINGS

Figure 1:
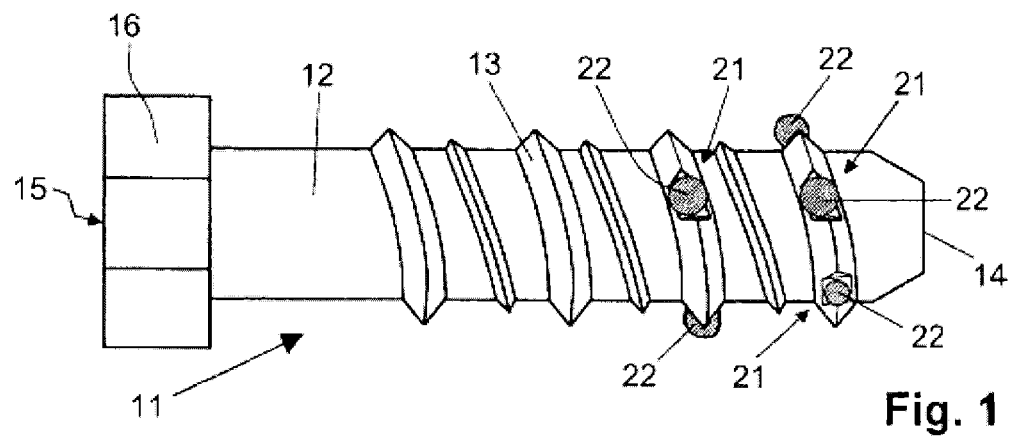
FIG. 1 is a first exemplary embodiment of the thread-forming screw in a lateral view.

In principle, the same references are used for identical parts in the drawings.

Figure 2:
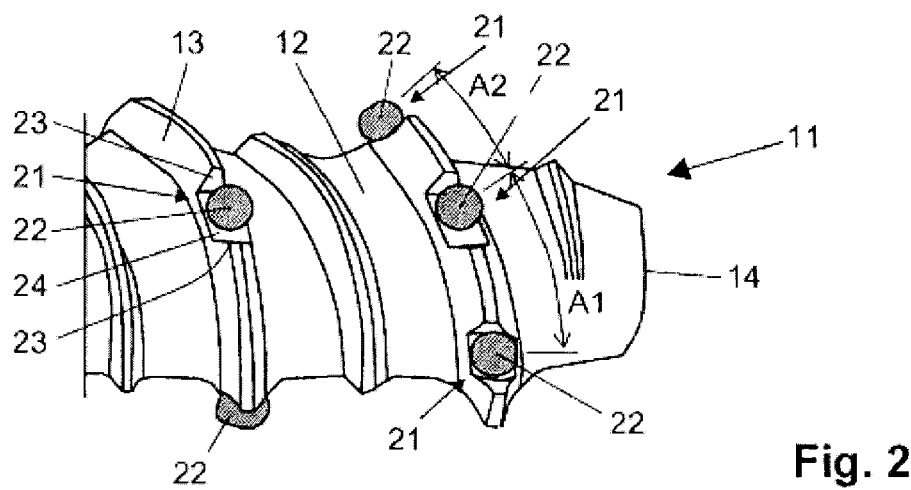
FIG. 2 is a detailed view of the exemplary embodiment shown in FIG. 1.

The thread-forming screw 11 shown in FIGS. 1 and 2 comprises a shank 12 of a corrosion-resistant material, for example, a steel material having a carbon content below 0.5%, and a thread 13 formed in one piece on the shank 12 extending region-wise starting at a free end region 14 in the direction of a second end 15 of the shank 12. At the second end 15 of the shank 12, a hexagon head 16 is provided as a torque application means or load application means, respectively, for the screw 11.

On the thread 13, a plurality of longish recesses 21 is provided for receiving compact cutting elements 22 of a hard metal in the form of spheres whose hardness is greater than the hardness of the thread. The recesses 21 have lateral walls 23 and a bottom section 24 which is radially spaced apart from the outer circumference of the shank 12. The cutting elements 22 are arranged so as to be spaced apart from the walls 23 of the recesses 21 and region-wise project radially outward beyond the thread. The cutting elements 22 are welded into the thread by electric resistance welding so as to create a firm bonding. The recesses 21, and thus the cutting elements 22, are provided with spaces A1, A2, etc., with respect to each other along the course of the thread. The spaces increase starting at the free end region 14 of the shank 12 in the direction of the second end 15 of the shank 12.

Figure 3:
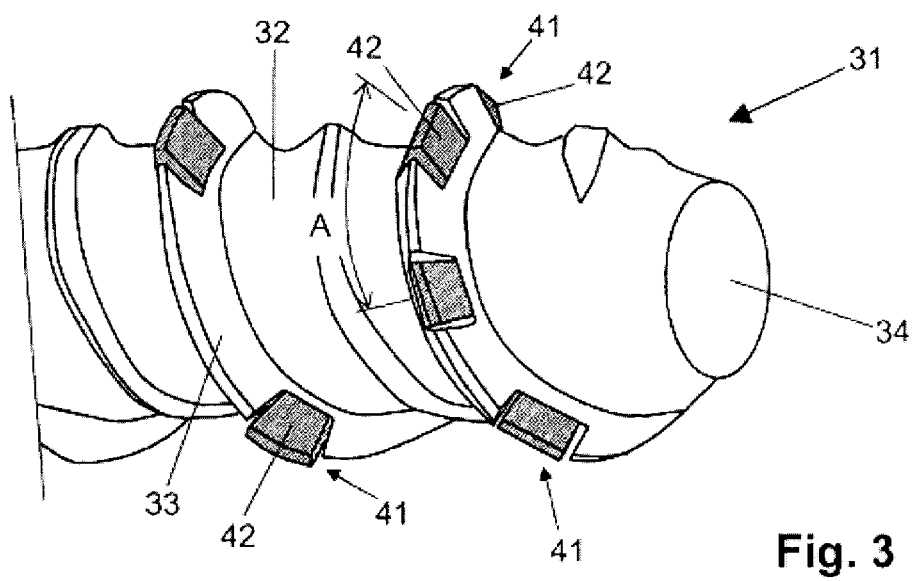
FIG. 3 is a detailed view of a second exemplary embodiment of the thread-forming screw.

The thread-forming screw 31, which is only partly shown in FIG. 3, also has a shank 32 of a corrosion-resistant metal on which a thread 33 is formed extending region-wise starting at a free end region 34 in the direction of a second end of the shank 32. On the thread 33, a plurality of recesses 41 is provided for receiving compact cutting elements 42 of a hard material in the form of a truncated pyramid. The recesses 41 have an extent in the direction of the course of the thread that corresponds to the corresponding extent of the cutting elements 42 arranged in the thread 33.

The cutting elements 42 adjacent to the runout of the thread harmonically continue the thread 33 and in a region facing the second end of the shank region-wise have a radial outward projection relative to the thread 33. The cutting elements 42 are welded into the thread. The recesses 41 and thus the cutting elements 42 can also have spaces with respect to each other along the course of the thread. The spaces increase starting at the free end region 34 of the shank 32 in the direction of the second end of the shank 32.

Figure 4:
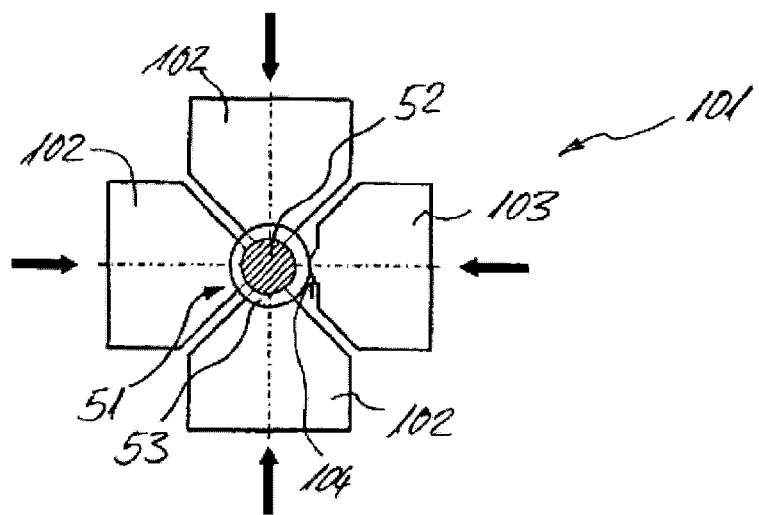
FIG. 4 is a schematic representation of a stamping device and a stamping process.

Based on FIGS. 4 to 6, the method of the invention for manufacturing a thread-forming screw 51 made, for example, of a corrosion-resistant metal, is described below. FIG. 4 also shows a stamping device 101 for carrying out the method.

First, on the shank 52 of the screw 51 a region-wise circumferentially arranged thread 53 is formed. Then the screw 51 is delivered to the stamping device 101 for stamping recesses 56 into the thread 53. The screw 51 is held in position by three holding devices 102 arranged offset from each other by 90°. Then, a stamping die 103 with a shaping portion 104 provided at its end facing the holding devices 102 is positioned relative to the shank 52 of the screw 51, while the, for example, longish recess 56 is formed in the thread 53. The holding devices 102 and the stamping die 103 are individually controlled. The recess 56 has lateral walls 58 and a bottom section 59 spaced apart from the outer circumference of the shank 52.

Instead of three holding devices 102 and one stamping die 103 the stamping device may also have more stamping dies and fewer holding devices so that when these stamping dies are moved relative to the screw a plurality of recesses is generated at the same time in the thread of the screw. Alternatively, the stamping die can also have more than one shaping portion so that when this stamping die is moved relative to the screw a plurality of recesses is generated at the same time in the thread of the screw.

Figure 5:
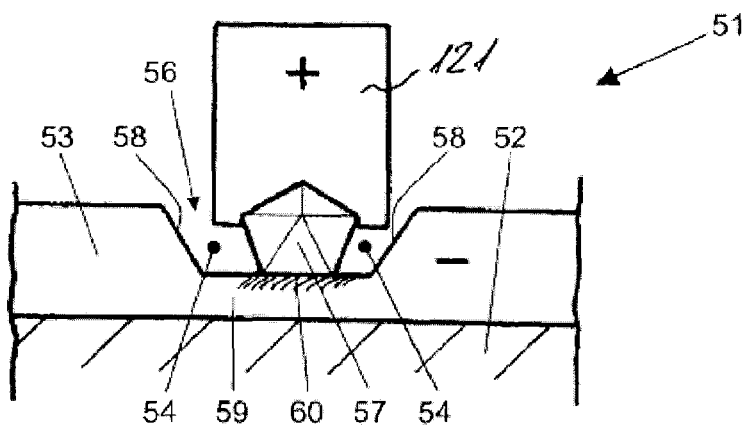
FIG. 5 is a schematic sketch of a cutting element arrangement and a welding process.
Figure 6:
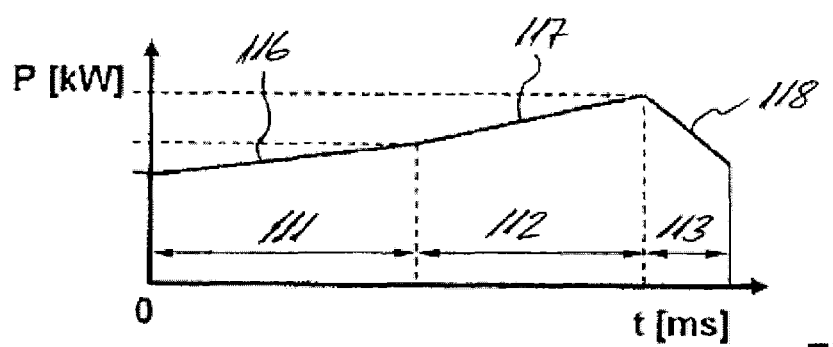
FIG. 6 is a schematic representation of the welding process based on a welding profile diagram.

The screw 51 is subsequently delivered to a welding station, which is not specifically shown here, where the compact cutting element 57 is fixed by electric resistance welding in the recess 56 in the thread 53 (FIG. 5). During the welding process, the cutting element 57 is held by a holding device 121, in this case a welding electrode, while a defined contact pressing force of 15 N to 40 N coming from the holding device 121 acts upon the welded body 57. This contact pressing force advantageously acts multi-axially, for example bi-axially, on the one hand, radially in the direction of the shank 52, and on the other hand, tangentially in the direction of the thread 53.

The compact cutting element 57 is arranged spaced apart from the walls 58 on both sides so as to create free spaces 54 for removed material. The stamping of the recesses 56 and the welding in of the compact cutting elements 57 are directly interlinked, and therefore after the stamping process the screw 51 does not have to be readjusted for the subsequent welding process.

The welding process for fixing the cutting elements 57 in the recesses 56 is carried out in three phases. In the diagram according to FIG. 6, the time is laid off in ms on the axis of abscissas and the supplied power is laid off in kW on the axis of the ordinate.

In the first phase 111 of the welding process the power is successively increased over a certain time period, wherein the base material of the screw 51 and the cutting element 57 are heated. Section 116 of the first phase 111 has a positive slope. The first phase 111 can consist of a plurality of partial phases, wherein the course of the resulting section does not necessarily have to be linear, as shown in FIG. 6, for example.

In the immediately following second phase 112, the cutting elements 57 are fixed in the recesses 56, and in this phase 112 more power is supplied over a shorter time period compared to the first phase 111. As a result, the course of the slope delta power to delta time in section 117 has a greater positive rise than section 116 in the first phase 111. The second phase 112 can also consist of a plurality of partial phases, wherein the course of the resulting section does not necessarily have to be linear, as shown in FIG. 6, for example.

In the third phase 113, following the second phase 112, the power is reduced over a certain time period until the power corresponds to the power at the beginning of the welding process or the power at the beginning of the first phase 111, respectively. In the third phase 113, the completed weld is cooled down. Section 118 of the third phase 113 has a negative slope. The third phase 113 can also consist of a plurality of partial phases, wherein the course of the resulting section does not necessarily have to be linear, as shown in FIG. 6, for example.

By controlling the welding device via a welding program especially optimized for this application, the heat exposure generated during the welding process is limited to a fixing region 60 which advantageously does not extend or extends only slightly into the shank 52.

Figure 7:
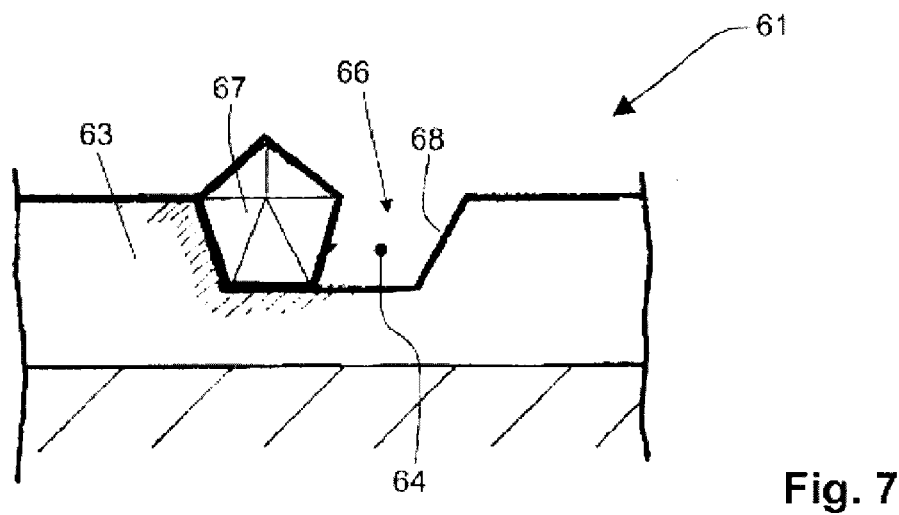
FIG. 7 is a schematic sketch of another cutting element arrangement.

FIG. 7 shows another arrangement of a cutting element 67 in a longish recess 66 in the thread 63 of a screw 61, wherein the cutting element 67 is arranged so as to be spaced apart from only one wall 68 of the recess 66. With this type of arrangement of the cutting element 67, a free space 64 is created in the recess 66 which is arranged on one side and which is greater compared to the arrangement of the cutting element 57 shown in FIG. 5.

Figure 8:
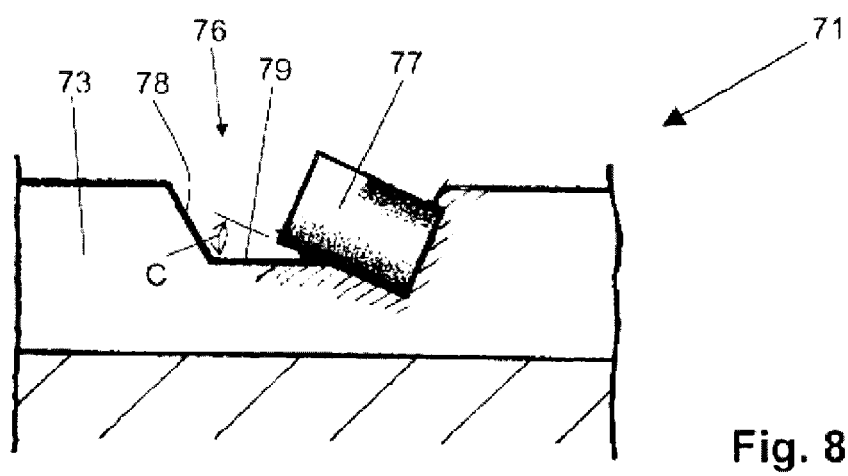
FIG. 8 is a schematic sketch of another cutting element arrangement.

FIG. 8 shows as an exemplary embodiment of the invention, which is not a final embodiment. A circular cylindrical cutting element 77 of a thread-forming screw 71 is arranged in a recess 76 in the thread 73 at an angle C relative to a bottom section 79 and spaced apart from a wall 78.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for manufacturing a thread-forming screw having a shank and a thread formed in one piece with the shank, and at least region-wise, circumferentially arranged on the shank, comprising the steps of:
    forming the thread on the shank;
    stamping of a plurality of recesses into the thread after the step of forming; and
    fixing a plurality of cutting elements in the plurality of recesses in the thread by welding, respectively, wherein the cutting elements are made of a hard material and have a hardness greater than a hardness of the thread.

2. The method according to claim 1, wherein the stamping and the welding are directly interlinked.

3. The method according to claim 1, wherein a plurality of the plurality of recesses is stamped at a same time into the thread.

4. The method according to claim 1, wherein a plurality of successive recesses of the plurality of recesses is stamped at a distance from each other and wherein the distance increases starting at a free end region of the shank along a course of the thread.

5. The method according to claim 1, wherein the plurality of recesses each have a bottom section radially spaced apart from an outer circumference of the shank.

6. The method according to claim 1, wherein the plurality of recesses have walls and wherein a respective cutting element positioned in a recess is spaced apart from at least one of the walls.

7. The method according to claim 1, wherein the welding is electric resistance welding.

8. The method according to claim 1, wherein the welding takes place in a plurality of phases.

9. The method according to claim 8, wherein the phases are controlled via a closed loop.

10. The method according to claim 8, wherein the welding comprises a first phase for heating a base material of the screw and a respective cutting element, a second phase for fixing the respective cutting element in a respective recess, and a third phase for cooling down a generated weld.

11. The method according to claim 10, wherein the first phase, the second phase and/or the third phase consist of a plurality of partial phases.

12. The method according to claim 10, wherein a slope delta power to delta time in the second phase is greater than in the first phase.

13. The method according to claim 1, wherein the welding takes place with a defined contact pressing force of 5 N to 100 N coming from a holding device for a respective cutting element and acting upon the respective cutting element.

14. The method according to claim 13, wherein the defined contact pressing force acts multi-axially.

\* \* \* \* \*